United States Patent [19]

Nestor et al.

[11] Patent Number: 5,864,338

[45] Date of Patent: Jan. 26, 1999

[54] SYSTEM AND METHOD FOR DESIGNING MULTIMEDIA APPLICATIONS

[75] Inventors: Alex Jay Nestor, Allen; Michael W. Schwartz, Plano; Christopher M. Dittman; Robert K. Wilcox, both of Dallas; Kathryn G. Smithhisler, Frisco, all of Tex.

[73] Assignee: Electronic Data Systems Corporation, Plano, Tex.

[21] Appl. No.: 717,037

[22] Filed: Sep. 20, 1996

[51] Int. Cl.$^6$ ........................................... G06F 3/00

[52] U.S. Cl. ........................... 345/339; 345/302; 707/516

[58] Field of Search ................... 345/339, 346, 345/302, 352, 902; 395/701, 702; 807/104, 908, 516

[56] References Cited

U.S. PATENT DOCUMENTS

| | | | |
|---|---|---|---|
| 5,307,456 | 4/1994 | MacKay | 345/328 |
| 5,608,859 | 3/1997 | Taguchi | 345/302 X |
| 5,613,057 | 3/1997 | Caravel | 345/302 |
| 5,659,793 | 8/1997 | Escobar et al. | 345/302 |
| 5,680,619 | 10/1997 | Gudmundson et al. | 395/701 X |

FOREIGN PATENT DOCUMENTS 6311480  12/1994  Japan.

*Primary Examiner*—A. Katbab
*Attorney, Agent, or Firm*—L. Joy Griebenow

[57] ABSTRACT

A system for designing a multimedia application (27) is provided. The system includes an assembly template (14, 16, 18) having predetermined processor operating commands and related data. The assembly template (14, 16, 18) is adapted to allow a user to add to and modify and the processor operating commands and related data, and to generate multimedia application navigator system controls (22). A processor (10, 56) receives the modified processor commands of the assembly template (14, 16, 18) and generates the multimedia application navigator system controls (22).

18 Claims, 4 Drawing Sheets

SYSTEM AND METHOD FOR DESIGNING MULTIMEDIA APPLICATIONS

TECHNICAL FIELD OF THE INVENTION

This invention relates in general to multimedia applications, and more particularly to a system and method for designing a multimedia application.

BACKGROUND OF THE INVENTION

A popular personal computer application finding a wide variety of uses is the multimedia application. The multimedia application typically displays visual and audio images to one or more users. The visual images may include text, graphics as well as video. One problem with multimedia applications is that their design is time consuming and complicated. To aid in the design of such multimedia applications, various design tools have been proposed. Multimedia applications design tools are used to assemble collections of multimedia data and to define the connections for links between the data files. For example, a multimedia application may include a data file that creates a visual image when processed by a visual image generation system. Other data files may generate audible sounds when processed by a sound generating system.

While multimedia application design tools do aid in the construction of the multimedia application, many of them are complex and require many hours for the user to learn how to use the design tool. Many of the conventional design tools also require the designer to keep track of operating parameters. Failure to set the various operating parameters in proper condition can result in system failure such as causing the application to access files out of order. This problem may be more significant in a local area network, where multiple users may have access to a plurality of multimedia application data files.

Another problem with the design of multimedia applications is the requirement that some data files such as graphic images, text files or audio files, may require resources or drivers for generating the corresponding image, text or sound. If these drivers are not present or are not linked to the specific data files, the multimedia application may not function. Many of the conventional tools available to multimedia designers require the designer to specifically link the data file to its corresponding driver. Failure by the designer to make the link may result in an inadvertent design error causing the multimedia application to malfunction.

SUMMARY OF THE INVENTION

Therefore, a need has arisen for a system and method for multimedia application design that allows a multimedia application designer to design a multimedia application that is resistant to malfunction. In addition, a system and method for multimedia application design is required that allows a user to access the multimedia application with a multimedia navigator system but prevents the user from violating applicable software protocols or otherwise causing the multimedia navigator system to malfunction.

Accordingly, a system for designing a multimedia application that substantially eliminates or reduces problems associated with prior solutions is presented. According to one embodiment of the present invention, a system for designing a multimedia application is provided. The system includes an assembly template having predetermined processor operating commands and related data. The assembly template is adapted to allow a user to add to and modify the processor operating commands and related data, and to generate multimedia application navigator system controls. A processor receives the modified processor commands of the assembly template and generates the multimedia application navigator system controls.

One important technical advantage of the present invention is that the system of the present invention incorporates safeguards into the multimedia application that prevent the multimedia application from causing software malfunctions when it is accessed by a multimedia navigator system. According to this embodiment of the present invention, templates are provided for a multimedia application designer that automatically incorporate protective elements that prevent a user from exiting or entering the multimedia application at improper access points.

Another important technical advantage of the present invention is that the system of the present invention provides a standard format for a multimedia application, such as for an instructional presentation. According to this embodiment of the present invention, a multimedia application designer is provided with a format that simplifies the multimedia application design process and allows a designer with incomplete knowledge of the multimedia application design system to design a multimedia application that will not cause a malfunction in the multimedia navigator system used to access the multimedia application.

BRIEF DESCRIPTION OF THE DRAWINGS

For a more complete understanding of the present invention and advantages thereof, reference is made to the following description taken in conjunction with the accompanying drawings, in which like reference numbers indicate like features and wherein.

DETAILED DESCRIPTION OF THE INVENTION

Figure 1:
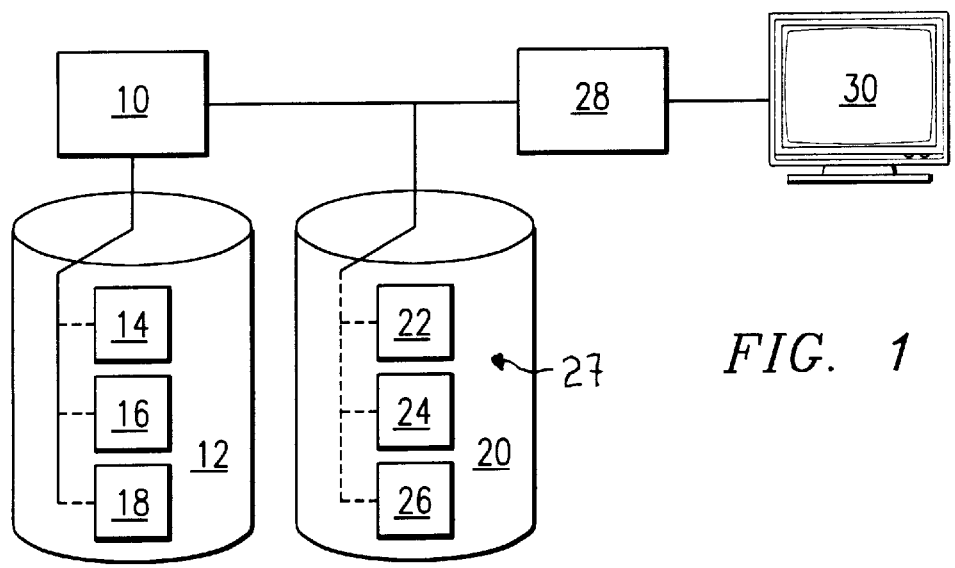
FIG. 1 is an exemplary multimedia application design tool embodying concepts of the present invention.

FIG. 1 is an exemplary multimedia application design tool 10 embodying concepts of the present invention. Multimedia application design tool 10 couples to template storage 12 and multimedia file storage 20. Also shown in FIG. 1 is multimedia navigator system 28, which couples to multimedia file storage 20 and audiovisual display 30.

Multimedia application design tool 10 is operable to retrieve startup template file 14, unit template file 16, and menu template file 18 from template storage 12. A multimedia application designer then modifies startup template file 14, unit template file 16, and menu template file 18 to create multimedia application controls file 22. Multimedia application controls file 22 is stored in multimedia file storage 20, and may comprise a plurality of files, data stored within a predetermined command section of suitable files, any combination of these options, or other suitable file configurations. Multimedia navigator system 28 is operable to retrieve multimedia application controls file 22 and to allow a user of multimedia navigator system 28 to hear audio files 24 and see graphical files 26 with audiovisual display 30 in accordance with processor operating commands in multimedia application controls file 22. Multimedia application 27 comprises audio files 24, graphical files 26, and multimedia application controls file 22. Audio files 24 and graphical files 26 may alternately be integrated with multimedia applications controls file 22 to form a single integrated application file, if suitable.

For example, multimedia application 27 may present a software training course to a user of multimedia navigator system 28. The user would be presented with a menu of choices to access training units for the various features of the software application. After selection a specific training unit, multimedia navigator system 28 would present graphical files 26 and play audio files 24 containing instructional material. The user would also be presented with navigational options during the audiovisual presentation, such as the options to go forward or backward through the presentation, to exit the present unit, or to exit multimedia application 27.

Multimedia application design tool 10 is a software application that operates on a central processing system. Multimedia application design tool 10 may comprise one or more software applications, and may comprise a commercially available multimedia presentation design tool such as AUTHORWARE, manufactured by Macromedia, Inc., SCREENCAM, manufactured by Lotus, Inc., SCRIPTER, manufactured by Screenplay Systems, Inc.,[1] or other similar software applications. In addition, multimedia application design tool 10 may comprise software with less than total multimedia capability, such as HARVARD GRAPHICS, LOTUS 1-2-3, FREELANCE GRAPHICS, or other similar software applications. Startup template file 14, unit template file 16, and menu template file 18 may be organized as a software toolkit system for use with multimedia application design tool 10.

[1] ICONAUTHOR, manufactured by Almtech; QUEST, manufactured by Allen Communications; MULTIMEDIA TOOL BOOK, manufactured by Asymmetrics;

Template storage 12 may comprise a data storage device such as a disk drive, tape drive, zip drive, compact disc drive, or similar data storage device. Template storage 12 is operable to store startup template file 14, unit template file 16, and menu template file 18. Template storage 12 couples to multimedia application design tool 10, and is operable to allow startup template file 14, unit template file 16, and menu template file 18 to be retrieved by multimedia application design tool 10.

Startup template file 14, unit template file 16, and menu template file 18 are software templates that contain predetermined data that may be used by a designer using multimedia application design tool 10 to create multimedia application controls file 22. Startup template file 14, unit template file 16, and menu template file 18 may comprise one or more additional template files.

Startup template file 14 contains processor operating commands that cause multimedia navigator system 28 to properly setup multimedia application 27. For example, the commands in startup template file 14 may set the type font displayed by multimedia navigator system 28, cause multimedia navigator system 28 to verify the presence of audio files 24 and graphical files 26 included in multimedia application 27 prior to operation, and cause multimedia navigator system 28 to check the hardware configuration of the system operating multimedia application 27 and to generate a warning where the hardware configuration will not allow multimedia application 27 to be properly displayed.

Unit template file 16 contains processor commands that cause multimedia navigator system 28 to access audio files 24 and graphical files 26. The commands in unit template file 16 may identify a predetermined sequence of files to be displayed in a predetermined number of units for multimedia application 27. The number of units may be specified by the multimedia presentation designer. For example, if multimedia application 27 is a training tool for using software, the multimedia presentation designer may choose to have a different unit for each different design feature of the software. Likewise, if the multimedia presentation is an encyclopedia, then the multimedia designer may choose to have a different unit for each letter of the alphabet. In addition, unit template file 16 may correlate audio files 24 and graphical files 26 that should be displayed simultaneously.

Menu template file 18 contains processor commands that cause multimedia navigator system 28 to present menu choices to users of multimedia navigator system 28. The commands in menu template file 16 may include commands that allow a user of multimedia navigator system 28 to go back to a previous menu or presentation screen, go forward to the next screen, or select on-screen option choices, such as icons. For example, if multimedia application 27 is a training tool for using software, the multimedia presentation designer may choose to have user-selectable icons for branching to different presentation screens. In addition, menu template file 18 may coordinate different menus such that users may navigate between menus instead of or in addition to presentation screens.

In addition to the processor commands described above, startup template file 14, unit template file 16, menu template file 18, and any template files which they comprise may include processor commands that convert error messages generated by multimedia application design tool 10 or other systems into designer information messages. The error messages are generated when a designer using multimedia application design tool 10 enters incorrect user commands or initial selections. The designer information messages present predetermined data to the designer that includes an explanation of the error message, an explanation of what caused the error message, and suggested options for resolving the problem which caused the error message to occur. The processor commands contained within startup template file 14, unit template file 16, menu template file 18, and any template files which they comprise also prevent the data which caused the error message to occur from terminating the operation of multimedia application design tool 10.

Multimedia navigator system 28 comprises a software application that operates on a central processing system. Multimedia navigator system 28 may comprise one or more software applications, and may comprise a viewer program that is compatible with a commercially available multimedia presentation design tool such as AUTHORWARE, SCREENCAM, SCRIPTER, or other similar software applications. In addition, multimedia navigator system 28 may include software with less than total multimedia capability, such as HARVARD GRAPHICS, LOTUS 1-2-3, FREELANCE GRAPHICS, or other similar software applications. Multimedia navigator system 28 is operable to retrieve multimedia application controls file 22, and to allow a user of multimedia navigator system 28 to hear audio files 24 and see graphical files 26 over audiovisual display 30 in accordance with controls in multimedia application controls file 22.

In operation, a multimedia application designer uses multimedia application design tool 10 to design multimedia application 27. The designer uses audio resources such as audio files 24 and graphics resources such as graphical files 26 to design multimedia application 27. In addition, the designer uses startup template file 14, unit template file 16, and menu template file 18 to create multimedia controls file 22, which is stored on multimedia file storage 20 with audio files 24 and graphical files 26. A user of multimedia navigator system 28 is then able to access multimedia application 27 over audiovisual display 30 by utilizing multimedia application controls file 22, audio files 24, and graphical files 26.

Figure 2:
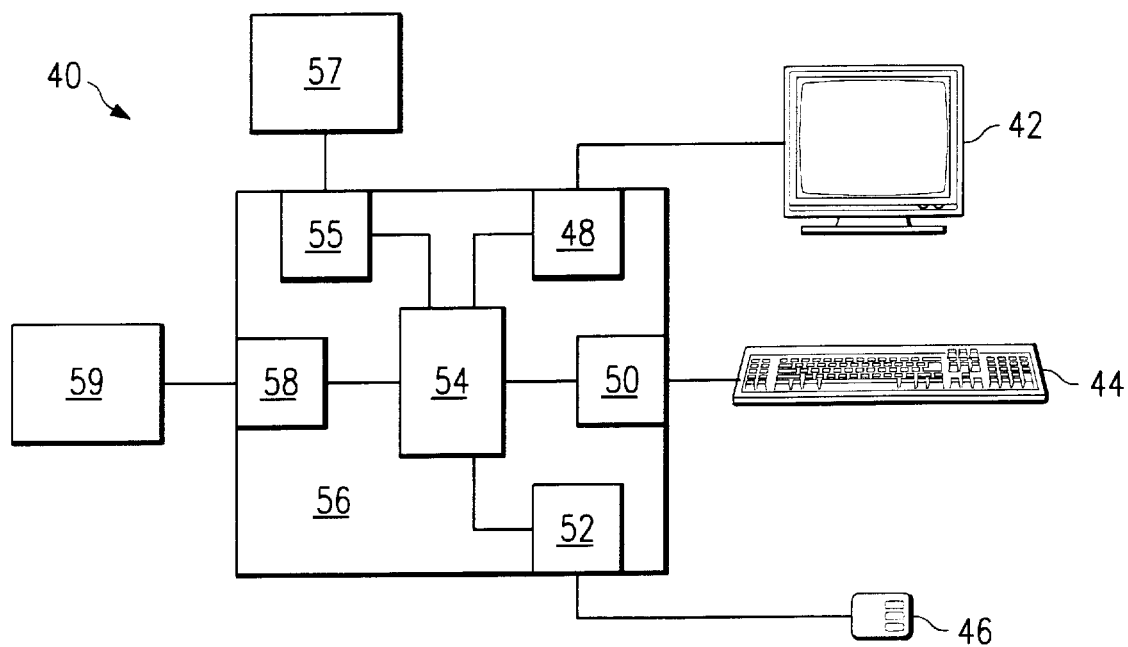
FIG. 2 is an exemplary data processing system including a software toolkit system embodying concepts of the present invention.

FIG. 2 is an exemplary data processing system 40 embodying concepts of the present invention. Data processing system 40 comprises central processing system 56 which is coupled to a display 42, a keyboard 44, a pointing device 46, a data storage system 57, and an audio device 59. In order to interface with the peripheral components described, central processing system 56 uses, respectively, a display interface system 48, a keyboard interface system 50, a pointing device interface system 52, and an audio interface system 58. According to the teachings of the present invention, central processing system 56 also comprises a software toolkit system 54, which performs the functions described with reference to multimedia application design tool 10 and startup template file 14, unit template file 16, and menu template file 18.

Central processing system 56 may comprise a suitable data processing system such as, for example, a personal computer that comprises a microprocessor, random access memory (RAM), magnetic storage media, and other typical components. Central processing system 56 may alternately comprise other suitable data processing systems, such as a work station or a lap top computer, that are functional to operate and support display interface system 48, keyboard interface system 50, pointing device interface system 52, data storage system 57, audio interface system 58, and software toolkit system 54. Central processing system 56 may include one or more microprocessors and various add-on modules such as network interface cards, printer cards, sound cards, CD ROM drive interface cards, and modem cards.

Display 42 is a visual interface that is used to present visual images including text and graphics for viewing by a user. Display 42 may comprise a monitor using a cathode ray tube, a liquid crystal diode or other suitable visual interface device. Display 42 couples to display interface system 48 operating on central processing system 56, which supplies image data to display 42 from other systems.

Display interface system 48 comprises suitable hardware and operating system software and software applications that operate on central processing system 56. Display interface system 48 couples to display 42 and software toolkit system 54. Display interface system 48 is operable to receive data from software toolkit system 54 and other systems and to transmit the data to display 42.

Keyboard 44 couples to keyboard interface system 50 operating on central processing system 56. Keyboard 44 comprises a data entry device that allows a user to enter data into central processing system 56 through keyboard interface system 50.

Pointing device 46 couples to pointing device interface system 52 operating on central processing system 56. Pointing device 46 comprises a data entry device such as a mouse or trackball that allows a user to enter data into central processing system 56 through pointing device interface system 52.

Audio device 59 couples to audio interface system 58 operating on central processing system 56. Audio device 59 is a sound generating device that receives analog or digital data from audio interface system 58 and generates audible sounds derived from the analog or digital data. For example, audio device 59 may comprise a speaker coupled to an amplifier and an oscillator.

Audio interface system 58 comprises suitable hardware and operating system software and software applications that operate on central processing system 56. Audio interface system 58 couples to audio device 59 and software toolkit system 54. Audio interface system 58 is operable to receive data from software toolkit system 54 and other systems and to transmit the data to audio device 59.

Keyboard interface system 50 comprises suitable hardware and operating system software and software applications that operate on central processing system 56. Keyboard interface system 50 couples to keyboard 44 and software toolkit system 54. Keyboard interface system 50 is operable to transmit user-entered data to software toolkit system 54 and other systems.

Pointing device interface system 52 comprises suitable hardware and operating system software and software applications that operate on central processing system 56. Pointing device interface system 52 couples to pointing device 46 and software toolkit system 54. Pointing device interface system 52 is operable to receive data from pointing device 46 and to transmit the data to software toolkit system 54 and other systems.

Data storage system 57 comprises a data memory device, such as a RAM, a magnetic media hard drive, a magnetic tape drive, or other suitable data memory devices. Data storage system 57 couples to data storage interface system 55 and is operable to store and retrieve digitally-encoded data in response to operating system commands.

Data storage interface system 55 comprises suitable hardware and operating system software and software applications that operate on central processing system 56. Data storage interface system 55 couples to data storage system 57 and software toolkit system 54. Data storage interface system 55 is operable to receive data from software toolkit system 54 and other systems and to store the data on and retrieve the data from data storage system 57.

Software toolkit system 54 is a software application that operates on central processing system 56 and couples to display interface system 48, keyboard interface system 50, data storage interface system 55, audio interface system 58, and pointing device interface system 52. Software toolkit system 54 is operable to receive data from keyboard 44 through keyboard interface system 50 and pointing device 46 through pointing device interface system 52. Software toolkit system 54 is further operable to retrieve data from data storage system 57 through data storage interface system 55. Software toolkit system 54 is further operable to process data and files and to transmit appropriate data according to programmed instructions to display 42 through display interface system 48 and to audio device 59 through audio interface system 58. Software toolkit system 54 is a multimedia navigator controls assembly system that is operable to combine the processor operating commands in predetermined templates so as to create the multimedia application navigator controls in multimedia application controls file 22.

In operation, a multimedia application designer using data processing system 40 enters appropriate commands through keyboard 44 or pointing device 46 to activate software toolkit system 54. Software toolkit system 54 then presents the designer with a series of graphical user interfaces that include designer-selectable input screens that may be used to format a multimedia presentation. For example, a designer may be presented on display 42 with various templates for forming a multimedia presentation. These templates are stored on data storage system 57, and are retrieved by software toolkit system 54 and displayed on display 42. The designer enters commands to software toolkit system 54 through keyboard 44 to add, modify, or delete material from the templates, and to create or modify data files for incorporation into a multimedia application. After the designer has completed designing multimedia application 27, the designer may store multimedia application controls file 22, audio files 24, and graphical files 26 on data storage system 57.

One of ordinary skill in the art will recognize that data processing system 40 may comprise other configurations without departing from the spirit and scope of the present invention. For example, data processing system 40 may be a network-accessible system operating on a network server. Alternately, software toolkit system 54 may comprise two or more independent systems whose combined functions are equivalent to that of software toolkit system 54 as described herein.

Figure 3:
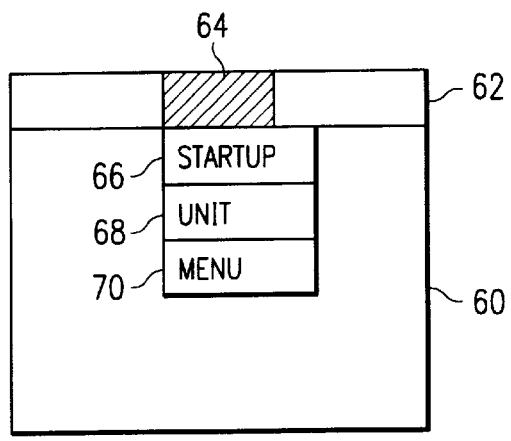
FIG. 3 shows an exemplary software toolkit system graphical user interface embodying concepts of the present invention.

FIG. 3 is an example of an interface screen 60 embodying concepts of the present invention. Interface screen 60 includes menu bar 62, pull down key 64, startup assembly icon 66, unit assembly icon 68, and menu assembly icon 70. Interface screen 60 may comprise many suitable graphical user interfaces generated on display 42.

Menu bar 62 is a graphical interface device that provides a designer using software toolkit system 54 with predetermined choices. For example, menu bar 62 may include choices for creating graphical data files for display with a graphical image processing system or for creating audio data files to be played by an audio data processing system. In addition, menu bar 62 may include a selection for selecting startup assembly icon 66, unit assembly icon 68, and menu assembly icon 70.

In operation, a multimedia application designer initiates multimedia application design procedures by selecting pull down key 64 from menu bar 62 to reveal startup assembly icon 66, unit assembly icon 68, and menu assembly icon 70. The designer selects any of these icons to access the templates of processor operating commands and related data associated with each template. The designer then edits the operating system command templates, as described in regards to FIGS. 4 through 10. For example, by selecting startup assembly icon 66, the designer may edit the startup assembly template that is stored in data storage system 57. These processor operating commands may then be stored as multimedia application controls file 22 and used by multimedia navigator system 28 to allow a user to access multimedia application 27 in a predetermined manner.

One of ordinary skill in the art will recognize that interface screen 60 may comprise other features without departing from the spirit and scope of the present invention. For example, instead of menu bar 62 and designer-selectable icons, interface screen 60 may include a command prompt, such as "enter one for startup assembly, two for unit assembly, or three for menu assembly." In addition, the sequence and appearance of each icon may be modified.

Figure 4:
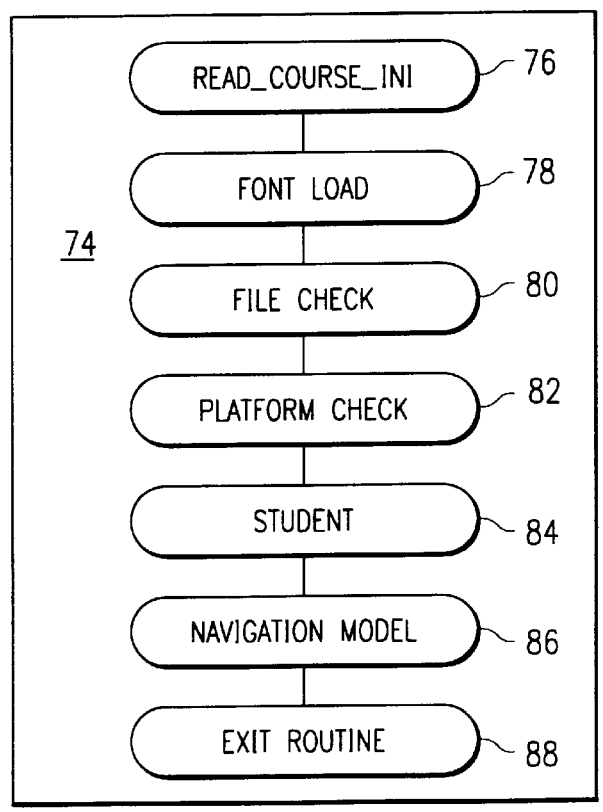
FIG. 4 shows an exemplary startup assembly screen graphical user interface organized in accordance with teachings of the present invention.

FIG. 4 is an exemplary startup assembly screen 74 organized in accordance with teachings of the present invention. Startup assembly screen 74 is a graphical user interface generated on display 42. Startup assembly screen 74 includes read COURSE.INI icon 76, font load icon 78, file check icon 80, platform check icon 82, student icon 84, navigational model icon 86, and exit routine icon 88.

Startup assembly screen 74 is used to access processor operating commands that control the initiation of multimedia application 27 created by software toolkit system 54. These processor operating commands are contained in separate files or data groups, and are associated with screen icons. When a multimedia application designer using software toolkit system 54 selects an icon such as read COURSE.INI icon 76, font load icon 78, file check icon 80, platform check icon 82, student icon 84, navigational model icon 86, and exit routine icon 88, they are either presented with the template of processor operating commands associated with that icon, or with additional icons. These additional icons may then be associated with processor operating commands or additional icons. The designer modifies the processor operating commands and software toolkit 54 is then used to convert the modified template files into multimedia application controls file 22.

As shown in FIG. 4, the icons on startup assembly screen 74 are displayed as being connected in a sequence. This sequence is indicative of the process or order in which the processor operating commands contained within the template associated with each icon are performed. The order of the processor operating commands may be changed by re-arranging the icons on startup assembly screen 74. The order of each icon may be changeable or fixed, according to system operational requirements.

In operation, software toolkit system 54 is used to design a multimedia application. A designer using software toolkit system 54 accesses startup assembly screen 74 by selecting startup assembly icon 66 from interface screen 60. The designer may then select any of the icons shown on startup assembly screen 74. As previously described, selection of an icon may provide a new screen with additional icons, or may provide a display of the processor operating commands and associated data contained within the template associated with that icon.

When a designer selects one of the icons on startup assembly screen 74, software toolkit system 54 retrieves the template file from data storage system 57 that is associated with that icon and displays the template data on display 42. For example, when a designer selects the read COURSE.INI icon 76, the designer is allowed to view the data in the COURSE.INI file. The COURSE.INI file is a software initiation template that includes data such as operating system parameters that must be reset in order for the multimedia navigator system 28 to function properly. In the design of a multimedia application, the read COURSE.INI icon 76 must precede all other icons.

The font load icon 78 is shown on startup assembly screen 74 connected to the read COURSE.INI icon 76. The template associated with the font load icon 78 includes processor operating commands that will be used to set the text display fonts. These text display fonts are used to display textual data presented by multimedia application 27 on display 42. The font load icon 78 is an optional icon, and may be omitted from the sequence shown on startup assembly screen 74. If the font load icon 78 is omitted, default fonts will be used by multimedia navigation system 28.

The file check icon 80 is an optional icon that may be selected by a designer to create a template that contains a list of files that must be present before multimedia navigator system 28 is allowed to navigate multimedia application 27. For example, a designer may enter the list of audio files 24 and graphical files 26 that define multimedia application 27. If all of these files are not present, the processor operating commands in the template associated with file check icon 80 prevent multimedia navigator system 28 from navigating multimedia application 27.

Platform check icon 82 is an optional icon that may be selected by a designer to access a template containing processor operating commands that check operating system parameters to determine whether the operating system has minimum hardware requirements. For example, audio files 24 and graphical files 26 may require a certain amount of RAM, sound card requirements, video card requirements, or other hardware in order to allow audio interface system 58 and display interface system 48 to operate properly. The data and processor operating commands within the template associated with platform check icon 82 may test the system for hardware parameters and return a warning message if system parameters are less than required, or may assign settings to such parameters, such as volume level.

Student icon 84 is an optional icon that may be selected by a designer to access a template containing processor operating commands that cause multimedia navigator system 28 to prompt the user of multimedia application 27 for a unique user identifier. Multimedia navigator system 28 then checks data files containing user identifiers to determine whether the user has accessed multimedia application 27 previously. If the user has not accessed multimedia application 27 previously, the processor operating commands in the template associated with student icon 84 cause multimedia navigator system 28 to present one or more introduction screens containing additional data to the user prior to continuing with multimedia application access. Student icon 84 must follow all other icons except for the navigational model icon 86 and exit routine icon 88.

The template associated with navigational model icon 86 contains processor operating commands and data that define navigational options for a multimedia application user. For example, the template associated with navigational model icon 86 may include commands that generate a "QUIT" icon on display 42. This "QUIT" icon when activated causes processor operating commands to be executed that cause the orderly shutdown of multimedia application 27 by multimedia navigator system 28, thus preventing system malfunction. Navigational model icon 86 is a mandatory icon that must be present on startup assembly screen 74 because the processor operating commands in the template associated with navigational model icon 86 are necessary for navigating through the multimedia presentation.

The template associated with exit routine icon 88 contains processor operating commands that cause multimedia navigator system 28 to reset system parameters, such as sound volume, fonts, file default directories, and other suitable data. In addition, the processor operating commands write data to the student record files for the current user of multimedia application 27 that identify the location in multimedia application 27 from which the student exited. There are no designer-entered variables in the processor operating commands in the template associated with exit routine icon 88. The exit routine icon 88 is a mandatory icon that must be included on startup assembly screen 74 because the processor operating commands in the template associated with exit routine icon 88 are necessary for properly exiting multimedia application 27.

In operation, a designer using software toolkit system 54 accesses startup assembly screen 74 to initiate design of a multimedia application. The designer selects suitable icons associated with startup assembly screen 74, such as all mandatory icons of and any desired optional icons. These icons are arranged as desired by the designer and as may be required by the sequence of processor operating commands contained within the templates. Once the designer has chosen all mandatory and optional icons, the designer selects each icon to edit the processor operating commands contained within the template associated with each icon. As noted, some templates contain no designer-changeable processor operating commands. Designer-changeable processor operating commands may be identified by a predetermined color, by high-lighting, or by other suitable method.

Once all designer-changeable processor operating commands have been edited by the designer, the designer saves the processor operating commands associated with startup assembly screen 74 to a file. Software toolkit system 54 converts this file and other files of processor operating commands into multimedia application controls file 22.

One of ordinary skill in the art will recognize that startup assembly screen 74 may comprise other features without departing from the spirit and scope of the present invention. For example, instead of designer-selectable icons, startup assembly screen 74 may include a command prompt, such as "enter one for read COURSE.INI template, two for font load template," etc. In addition, the sequence and appearance of each icon may be modified, and templates associated with icons that are described as being mandatory may be omitted if the associated processor operating commands are included with other templates.

Figure 5:
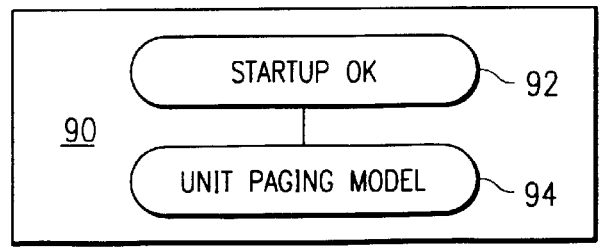
FIG. 5 shows an exemplary unit assembly screen graphical user interface embodying concepts of the present invention.

FIG. 5 is an exemplary unit assembly screen 90 embodying concepts of the present invention. Unit assembly screen 90 presents startup OK icon 92, and unit paging model icon 94. Unit assembly screen 90 is accessed by activating unit assembly icon 68 on interface screen 60 of FIG. 3.

Activation of startup OK icon 92 by a multimedia application designer causes software toolkit system 54 to display the processor operating commands stored within the template associated with startup OK icon 92. The template associated with startup OK icon 92 contains processor operating commands that verify that the execution of required startup commands has occurred prior to allowing audio files 24 and graphical files 26 to be accessed. For example, the template associated with startup OK icon 92 may include processor operating commands that verify activation of the COURSE.INI file or check for the presence of system variable settings. These processor operating commands prevent a user of multimedia navigator system 28 from activating multimedia application controls file 22 from other than the appropriate starting point.

For example, a user of multimedia navigator system 28 may activate a menu file for one of the unit modules contained within multimedia application 27 designed with software toolkit 54, in order to bypass the intervening multimedia application displays. The processor operating commands associated with startup OK icon 92 are included within multimedia application controls file 22, which is accessed when the menu file is activated. These processor operating commands prevent the user of multimedia navigator system 28 from bypassing the intervening multimedia application displays.

Figure 6:
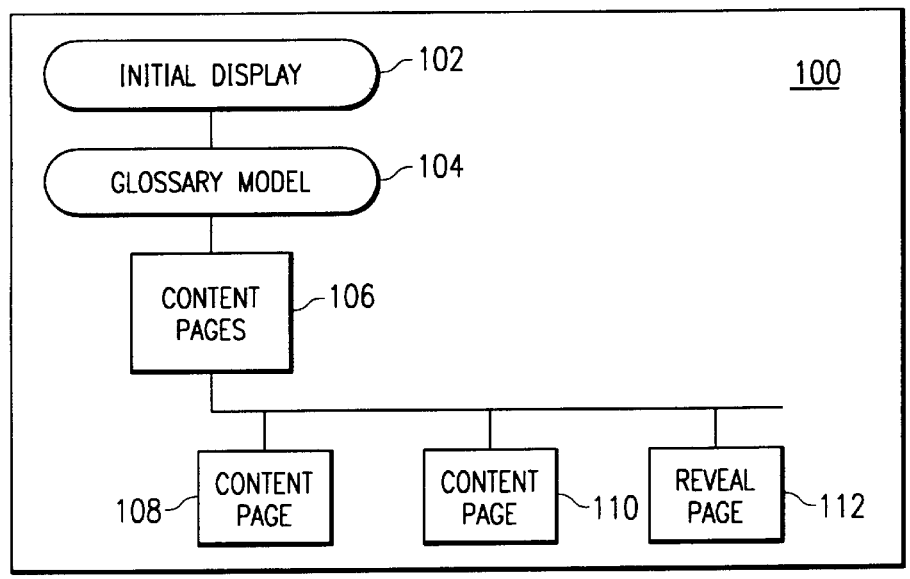
FIG. 6 shows an exemplary unit paging model screen graphical user interface embodying concepts of the present invention.

Selecting unit paging model icon 94 causes software toolkit system 54 to display unit paging model screen 100 of FIG. 6. There are no designer-accessible templates associated with unit paging model icon 94.

In operation, a multimedia application designer selects unit assembly icon 68 in order to design the units within a multimedia application. The menus associated with these units may include processor operating commands that access multimedia application controls file 22. Alternately, there may be individual navigation controls files associated with the menus of each unit that collectively form multimedia application controls file 22. The processor operating commands of the template associated with startup OK icon 92 are included in multimedia application controls file 22 or other suitable controls files, and prevent a user of multimedia navigator system 28 from bypassing intervening multimedia displays and accessing multimedia units within a multimedia application.

One of ordinary skill in the art will recognize that unit assembly screen 90 may comprise other features without departing from the spirit and scope of the present invention. For example, instead of designer-selectable icons, unit assembly screen 90 may include a command prompt, such as "enter one for startup OK template, two for unit paging model template," etc. In addition, the sequence and appearance of each icon may be modified.

FIG. 6 shows unit paging model screen 100. Included on unit paging model screen 100 are initial display icon 102, glossary model icon 104, content pages icon 106, content page icons 108 and 110, and reveal page icon 112. Content page icons 108 and 110 and reveal page icon 112 are exemplary, in that a multimedia application may include one or more content page icons 108 and one or more reveal page icons 112.

The template file associated with initial display icon 102 includes processor operating commands that will generate a default initial display. Alternately, a multimedia application designer may replace the default initial display commands with processor operating commands that generate a custom initial display. These processor operating commands may comprise data that are used by multimedia navigator system 28 to generate images for display.

Glossary model icon 104 is an optional icon that may be added to the unit paging model by a multimedia application designer. When present, the template associated with glossary model icon 104 includes processor operating commands that cause an icon to be generated on screen 30 displaying multimedia application 27 which allows a user of multimedia application 27 to access a glossary of words. For example, the glossary may include acronyms that are commonly used within multimedia application 27. A data file containing the glossary contents must also be referenced in the template associated with glossary model icon 104.

Selecting content pages icon 106 causes content page icons 108 and 110 and reveal page icon 112 to be displayed. Content page icons 108 and 110, when selected by a designer using software toolkit system 54, cause software toolkit system 54 to generate additional graphical user interfaces that display additional icons. These additional icons are associated with data file locations and processor operating commands that are used to navigate through multimedia application 27 created by a multimedia application designer. For example, content page icons 108 and 110 may be associated with file identifiers for files of textual, graphical, and audiovisual data. The multimedia application designer may include these files in the templates associated with content page icons 108 and 110, such that when a user of multimedia application 27 navigates through the multimedia application, the user may cause audio data contained within the files to be played or graphical data contained within the files to be displayed.

Likewise, the templates associated with content page icons 108 and 110 may include processor operating commands that generate a "previous screen" button on every visual display presented to a user while that user navigates multimedia application 27. When a user selects the "previous screen" button, processor operating commands contained within multimedia application controls file 22 cause multimedia navigator system 28 to return to the previously-displayed screen. Other templates may also have associated navigational sub-templates.

The template associated with reveal page icon 112 contains processor operating commands that cause sequential data screens to be displayed. For example, the data screens associated with reveal page icon 112 may comprise a single page of text that has been broken down into 8 layers. Upon selection of a "next page" navigational control by a user of multimedia navigator system 28, a layer of the text page will be revealed. If the 8 levels were to be defined by 8 paragraphs of text in sequence, an additional paragraph of text would be displayed after each selection of the "next page" navigational control by a user, with the entire page of text being displayed after the "next page" control has been selected eight times.

One of ordinary skill in the art will recognize that unit paging model screen 100 may comprise other features without departing from the spirit and scope of the present invention. For example, instead of designer-selectable icons, unit paging model screen 100 may include a command prompt, such as "enter one for initial display template, two for glossary model template," etc. In addition, the sequence and appearance of each icon may be modified.

Figure 7:
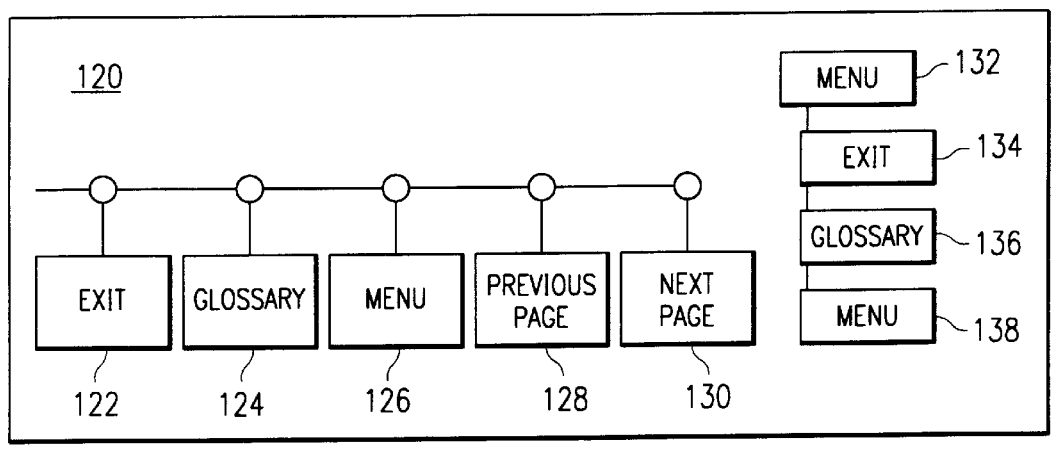
FIG. 7 shows an exemplary content page screen graphical user interface embodying concepts of the present invention.

FIG. 7 is an exemplary content page screen 120 embodying concepts of the present invention. Content page screen 120 is accessed by activation of content page icons 108 or 110 or 112 from unit paging model screen 100 of FIG. 6. Content page screen 120 includes exit icon control 122, glossary icon control 124, menu icon control 126, previous page icon control 128, and next page icon control 130. In addition, content page screen 120 includes menu title 132, exit menu icon 134, glossary menu icon 136, and menu icon 138.

In operation, a multimedia application designer who accesses content page screen 120 may create or alter the navigational connections between data files in multimedia application 27 by selecting menu icon 138. The template associated with menu icon 138 includes a menu of selections, one of which is "navigational control." If the designer selects "navigational control," the designer may modify the template of processor operating commands to cause multimedia navigator system 28 to generate appropriate navigational commands when a user of multimedia navigator system 28 is accessing multimedia application 27. These processor operating commands are included within multimedia application controls file 22.

One of ordinary skill in the art will recognize that content page screen 120 may comprise other features without departing from the spirit and scope of the present invention. For example, instead of designer-selectable icons, content page screen 120 may include a command prompt, such as "enter one for menu template, two for navigational control template," etc. In addition, the sequence and appearance of each icon may be modified.

Figure 8:
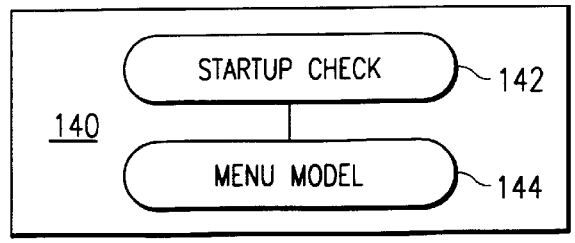
FIG. 8 shows an exemplary menu assembly screen graphical user interface organized in accordance with teachings of the present invention.

FIG. 8 is an exemplary menu assembly screen 140 organized in accordance with concepts of the present invention. Menu assembly screen 140 includes startup check icon 142 and menu model icon 144, and is accessed by selecting menu assembly icon 70 from interface screen 60 of FIG. 2. Menu assembly screen 140 is used to assemble and provide navigation connections between the menus that are presented to a user of multimedia navigator system 28.

The template associated with startup check icon 142 contains processor operating commands that cause multimedia navigator system 28 to prevent a multimedia application menu from being accessed without going through startup commands associated with startup assembly screen 74 of FIG. 4. For example, some multimedia navigator systems 28 may allow a user to access a menu file without entering multimedia application 27 at a predetermined start point. The processor operating commands contained within the template associated with startup check icon 142 prevent such access from occurring.

Figure 9:
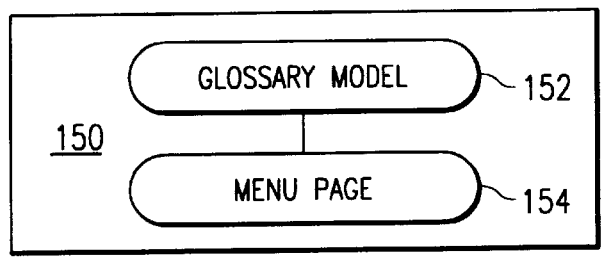
FIG. 9 shows an exemplary menu model screen graphical user interface embodying concepts of the present invention.

Selection of menu model icon 144 by a designer using software toolkit system 54 causes menu model screen 150 to be generated, as shown in FIG. 9. Menu model screen 150 is a graphical user interface presented on display 42. The designer may then select additional icons from menu model screen 150 that allow the designer to modify processor operating commands and to design menus that are used to structure access to multimedia application 27.

One of ordinary skill in the art will recognize that menu assembly screen 140 may comprise other features without departing from the spirit and scope of the present invention. For example, instead of designer-selectable icons, menu assembly screen 140 may include a command prompt, such as "enter one for startup check template, two for menu model template," etc. In addition, the sequence and appearance of each icon may be modified.

FIG. 9 is an exemplary menu model screen 150 embodying concepts of the present invention. Menu model screen 150 includes glossary model icon 152 and menu page icon 154. Menu model screen 150 is accessed by selecting menu model icon 144 from menu assembly screen 140 of FIG. 8.

Glossary model icon 152 is an optional icon that may be added to the unit paging model by a multimedia application designer. Glossary model icon 152 is similar to glossary model icon 104 that is associated with unit paging model screen 100, and should be included in menu assembly screen 150 if the glossary is to be accessible from menu screens of multimedia application 27. In contrast, glossary model icon 104 is included in unit paging model screen 100 when the glossary is to be accessible from the content pages or reveal pages of multimedia application 27. When included within multimedia application controls file 22, the processor operating commands within the template associated with glossary model icon 152 cause an icon to be generated on screen 30 of multimedia navigator system 28 which allows a user of multimedia application 27 to access a glossary of words. A data file containing the glossary contents must also be referenced in the template associated with glossary model icon 152.

Figure 10:
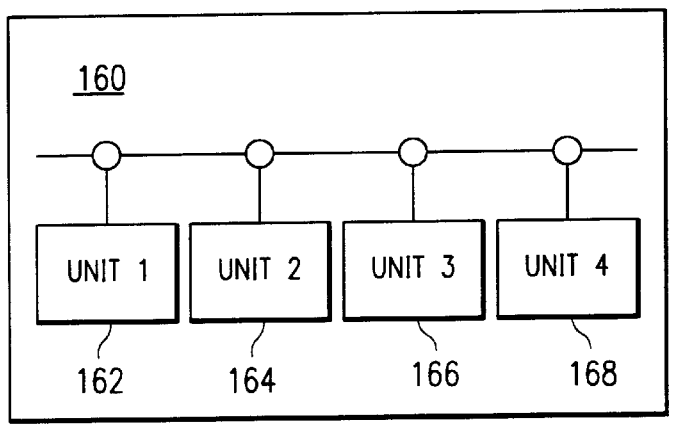
FIG. 10 shows an exemplary menu page screen graphical user interface organized in accordance with teachings of the present invention.

The template associated with menu page icon 154 contains processor operating commands that cause central processing system 56 to generate menu page screen 160 of FIG. 10 when menu page icon 154 is selected by a designer.

One of ordinary skill in the art will recognize that menu model screen 150 may comprise other features without departing from the spirit and scope of the present invention. For example, instead of designer-selectable icons, menu model screen 150 may include a command prompt, such as "enter one for glossary model template, two for menu page template," etc. In addition, the sequence and appearance of each icon may be modified.

FIG. 10 is an exemplary menu page screen 160 organized in accordance with teachings of the present invention. Menu page screen 160 includes unit one icon 162, unit two icon 164, unit three icon 166, and unit four icon 168. The number of unit icons shown is exemplary, and may vary from one to any suitable number of menus.

When a multimedia application designer using software toolkit system 54 selects one of unit one icon 162, unit two icon 164, unit three icon 166, or unit four icon 168 from menu page screen 160, software toolkit system 54 presents processor operating commands that are used to generate a menu for each of the units of multimedia navigator system 28. These menus are used to present the four units that comprise multimedia application 27. The designer may modify the processor operating commands that cause the menu screen associated with the unit icon to be generated. For example, by selecting unit one icon 162, the designer may enter processor operating commands that cause multimedia navigator system 28 to present menu options for unit one of multimedia application 27 to a user of multimedia navigator system 28 that is accessing multimedia application 27. Different navigation and graphical user interface options may be entered for each unit icon displayed, such that the menu generated from processor operating commands in the template associated with unit one icon 162 are different from the menu generated by processor operating commands in the template associated unit two icon 164, unit three icon 166, or unit four icon 168.

One of ordinary skill in the art will recognize that menu page screen 160 may comprise other features without departing from the spirit and scope of the present invention. For example, instead of designer-selectable icons, menu page screen 160 may include a command prompt, such as "enter one for unit one template, two for unit two template," etc. In addition, the sequence and appearance of each icon may be modified.

Figure 11:
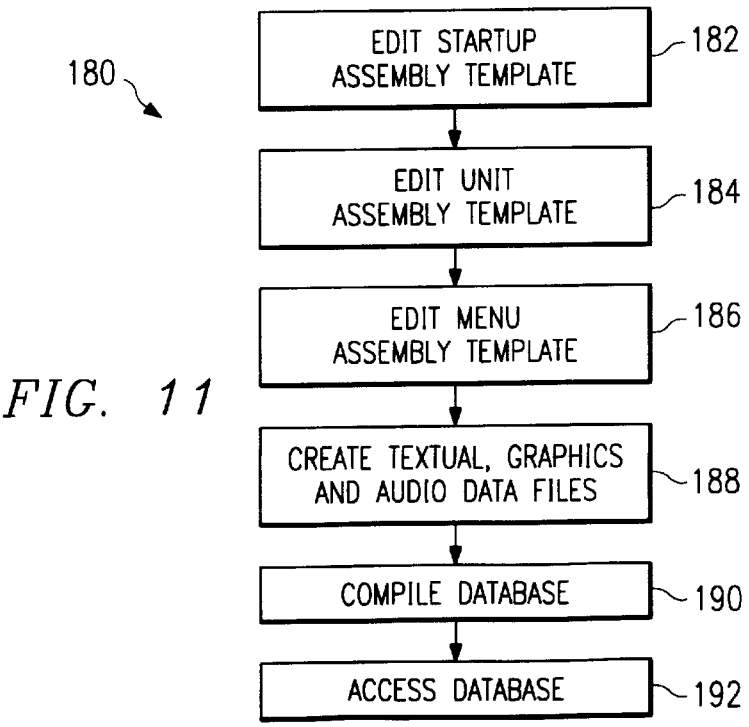
FIG. 11 is an exemplary flow chart of a method for implementing a software toolkit system organized in accordance with teachings of the present invention.

FIG. 11 is an exemplary flow chart 180 of a method for implementing software toolkit system 54 organized in accordance with teachings of the present invention. The method begins with step 182, where the startup assembly template associated with startup assembly icon 66 of FIG. 3 is retrieved and edited. The startup assembly template includes processor operating commands that cause multimedia navigator system 28 to set controllable processor operating system parameters from their original settings to predetermined settings. The startup assembly template includes three mandatory sub-templates, which are the file initiation template, the navigational template, and the startup exit template, and four optional sub-templates, which are the startup font load template, the startup file check template, the startup platform check template, and the startup student template. Each of these sub-templates is associated with an icon, such as those shown in FIG. 4. In addition, other suitable templates may be included that facilitate the initiation of navigation of multimedia application 27.

For example, when a user of multimedia navigator system 28 accesses multimedia application 27, such as for a training multimedia application, multimedia navigator system 28 first retrieves multimedia application controls file 22, which may comprise processor operating commands and other data. The processor operating commands contained within multimedia application controls file 22 are created by assembling the processor operating commands contained within each of the templates of software toolkit system 54, as modified by the designer of multimedia application 27. Alternately, software toolkit system 54 may create several separate files that contain in aggregate the processor operating commands contained within multimedia application controls file 22, or may incorporate some processor operating commands into audio files 24 and graphical files 26.

The file initiation template associated with read COURSE.INI icon 76 of FIG. 4 contains processor operating commands that cause multimedia navigator system 28 to execute predetermined commands. For example, the file initiation template preferably contains data that are typically found in a Microsoft WINDOWS*.INI file, such as default directory locations, default hardware drivers, mouse speed settings, file extensions, graphic display patterns, international codes, and default values for other system parameters. The previous values of any system parameters that are changed may also be stored in a temporary file by the processor operating commands of the file initiation template.

The navigational template associated with navigation model icon 86 of FIG. 4 contains processor operating commands that cause multimedia navigator system 28 to present a user with navigational options. The navigational template associated with navigation model icon 86 may contain processor operating commands that allow a user to navigate to other menus, or to return to a location that was previously accessed and "bookmarked" by the user.

The startup exit template associated with exit routine icon 88 of FIG. 4 contains processor operating commands that cause multimedia navigator system 28 to exit multimedia application 27. Any operating system parameters that were modified by the processor operating commands in the file initiation template or in the optional sub-templates are reset by the processor operating commands in the startup exit template. The startup exit template is used to return multimedia application 27 and multimedia navigator system 28 to a condition in which subsequent use of either multimedia application 27 or multimedia navigator system 28 will not result in system errors or malfunctions.

The startup font load template associated with font load icon 78 of FIG. 4 contains processor operating commands that cause multimedia navigator system 28 to change text display settings. The default font of text displayed by multimedia application navigator 28 may be modified with this template. If a startup font load template is used, the startup exit template may include additional commands to reset any font settings to their default values.

The startup file check template associated with file check icon 80 of FIG. 4 contains processor operating commands that cause multimedia navigator system 28 to check for the existence of audio files 24 and graphical files 26 of multimedia application 27. User access to multimedia application 27 may be prevented if the required data files are not available, thus preventing multimedia navigator system 28 from experiencing an operating error.

The startup platform check template associated with platform check icon 82 of FIG. 4 contains processor operating commands that cause multimedia navigator system 28 to generate a message when hardware parameters of multimedia navigator system 28 are less than predetermined values for those parameters. For example, if multimedia application 27 includes audio files 24 that require multimedia navigator system 28 to include a sound card, the processor operating commands of the startup platform check template may check for the presence of a sound card and generate a warning message advising the user of multimedia application 27 that access to the multimedia application may be limited because a sound card was not detected.

The startup student template associated with student icon 84 of FIG. 4 contains processor operating commands that cause multimedia navigator system 28 to prompt a user for identification. If the user has accessed multimedia application 27 before, the processor operating commands access a user-specific data file containing such data user-configured defaults and a "book mark" that indicates the point at which a user reached prior to exiting multimedia application 27 during the previous use. Likewise, if the user has not accessed multimedia application 27 before, the processor operating commands of the startup student template create a user-specific data file of system parameters, such as any user-specific settings and the "book mark."

At step 184, the unit assembly template associated with unit assembly icon 68 of FIG. 3 is retrieved and edited. The unit assembly template includes predetermined processor operating commands that cause multimedia navigator system 28 to define a relationship between audio files 24 and graphical files 26. As previously noted, these data files and the processor operating commands that define the relationship between the data files make up multimedia application 27. The menu assembly template includes a unit paging template, a startup check template, and content page templates. Each of these templates is associated with an icon, such as those shown in FIGS. 5 and 6.

The unit paging template associated with unit paging model icon 94 of FIG. 5 includes processor operating commands that cause data files to be retrieved and processed. The unit paging template contains one or more content page templates and reveal page templates associated with content pages icons 108 and 110 and reveal page icon 112 of FIG. 6. The content page templates and reveal page templates further contain navigational templates, such as those associated with the icons shown in FIG. 7. Content page templates and reveal page templates may contain textual, graphical, and audio data as integrated media elements in addition to 22. Alternately, content page templates and reveal page templates may contain data file identifiers for the textual, graphical, and audio data that should be displayed to a user of multimedia navigator system 24 when that content page is processed. The navigational template for each content page includes the other content pages or data files that may be accessed from the current content page, and also contains processor operating commands that generate user-selectable controls. In addition, the navigational template may include a default command for automatically proceeding to the next file in a sequence.

The startup check template associated with startup OK icon 92 of FIG. 5 includes processor operating commands that cause multimedia navigator system 28 to check for the existence of certain parameters when access to a multimedia application file is attempted, and to allow such access only when the parameters are present. For example, the processor operating commands that define the relationship between audio files 24 and graphical files 26 may be organized into separate unit files, such that multimedia navigator system 28 could access one of the unit files without beginning at the predetermined entry point for multimedia application 27. This improper sequencing could result in errors or system malfunctions of multimedia navigator system 28, and is prevented by the processor operating commands of the startup check template associated with startup OK icon 92.

After the unit assembly template has been edited, the method proceeds to step 186, where the menu assembly template associated with menu assembly icon 70 of FIG. 3 is edited. The menu assembly template includes predetermined processor operating commands that cause multimedia navigator system 28 to generate multimedia application navigation options. As previously discussed, the menu assembly template is organized with one or more separate unit templates, each with a unique navigational template. Each unit template is associated with an icon such as unit one icon 162, unit two icon 164, unit three icon 166, or unit 4 icon 168 of FIG. 10. The use of separate unit templates provides a multimedia application designer with design flexibility.

Each unit template of the menu assembly template contains processor operating commands that cause multimedia navigator system 28 to execute unique navigational commands. For example, the navigational commands associated with each unit may include commands for navigating between units, whereas the navigational commands associated with a content page may include commands for navigating between content pages.

After the menu assembly template has been edited at step 186, the method proceeds to step 188, where all audio files 24 and graphical files 26 that will be required by multimedia application 27 are created, if they have not been created prior to the initiation of the method of flow chart 180. At step 190, multimedia navigator control file 22 is compiled, such as by processing the commands in the templates created in steps 182 through 186. At step 192, a user may access multimedia application 27 with multimedia navigator system 28.

One of ordinary skill in the art will recognize that the order and appearance of the templates and method steps, as described above, may be altered or combined without departing from the spirit and scope of the present invention. For example, initial page templates, glossary page templates, or other templates may be added or deleted from assemblies and templates if suitable. In addition, template screens may be combined if desired, such as by combining menu assembly screen 140 of FIG. 8 and menu model screen 150 of FIG. 9.

Although the present invention has been described in detail, it should be understood that various changes, substitutions, and alterations can be made hereto without departing from the spirit and scope of the invention as defined by the appended claims.

What is claimed is:

1. A system for designing a multimedia application, the system comprising:

an assembly template having predetermined selectable initial application settings, the assembly template further adapted to communicate with a user and for receiving initial selections for each of the settings representative of the multimedia application, for generating commands responsive to the selected settings, and for generating messages responsive to incorrect initial selections;

a processor for receiving the commands from the assembly template and for generating a multimedia application navigator system controls file corresponding to the multimedia application; and wherein the assembly template further comprises:

a startup assembly template having predetermined processor operating commands that cause the processor to set controllable processor operating system parameters from original settings to predetermined settings;

a unit assembly template having predetermined processor operating commands that cause the processor to define a relationship between data files in a storage medium; and a menu assembly template having predetermined processor operating commands that cause the processor to generate first multimedia application navigation options.

2. The system of claim 1 further comprising a multimedia application navigator controls assembly system operable to combine the processor operating commands in the startup assembly template, the unit assembly template, and the menu assembly template, to create multimedia application navigator system controls.

3. The system of claim 1 wherein the startup assembly template further comprises a file initiation template having processor operating commands that cause the processor to execute predetermined commands for configuring the multimedia application navigator system.

4. The system of claim 1 wherein the startup assembly template further comprises a navigation template having processor operating commands that cause the processor to present a user with second multimedia application navigation options.

5. The system of claim 1 wherein the startup assembly template further comprises a startup exit template having processor operating commands that cause the processor to reset the controllable processor operating system parameters from the predetermined settings to the original settings.

6. The system of claim 1 wherein the startup assembly template further comprises a startup font load template having processor operating commands that cause the processor to change text display settings.

7. The system of claim 1 wherein the startup assembly template further comprises a startup file check template having processor operating commands that cause the processor to check for the existence of predetermined data files and to allow user access to the multimedia application only when all of the predetermined data files are present.

8. The system of claim 1 wherein the startup assembly template further comprises a startup platform check template having processor operating commands that cause the processor to generate a message when hardware parameters of the processor are less than predetermined values for those parameters.

9. The system of claim 1 wherein the startup assembly template further comprises a student template having processor operating commands that prompt a user for identification, access a user-specific data file of system parameters if the user has accessed the multimedia application before, and create a user-specific data file of system parameters if the user has not accessed the multimedia application before.

10. The system of claim 1 wherein the unit assembly template further comprises a unit paging template having processor operating commands that cause data files to be retrieved and processed.

11. The system of claim 1 wherein the unit assembly template further comprises a first startup check template having processor operating commands that cause the processor to check for the existence of certain parameters when access to a multimedia application file is attempted and to allow access to the multimedia application file only when the parameters are present.

12. The system of claim 10 wherein the unit paging template further comprises one or more content page templates, each content page template having processor operating commands that cause the processor to retrieve a predetermined data file and to activate one of a graphical data display system and an audio display system.

13. The system of claim 1 wherein the menu assembly template further comprises one or more unit templates having processor operating commands that cause the processor to present the user with navigational options.

14. The system of claim 1 wherein the menu assembly template further comprises a second startup check template having processor operating commands that cause the processor to check for the existence of certain parameters when access to a unique navigational template is attempted and to allow access to the multimedia application file only when the parameters are present.

15. A method for creating a multimedia application comprising the steps of:
   constructing an assembly template with predetermined selectable user settings;
   displaying the assembly template to a user;
   receiving user commands for selecting the user settings;
   generating messages responsive to incorrect user commands;
   generating a multimedia application navigator system controls file;
   generating a multimedia application corresponding to the multimedia application navigator system controls file; and
   wherein the step of generating a multimedia application navigator system controls file further comprises the steps of:
      retrieving a data file containing a modified assembly template;
      processing the data file to convert the modified assembly template into a multimedia application navigator system controls file; and
      storing the multimedia application navigator system controls file.

16. The method of claim 15 wherein the step of constructing and assembly template further comprises the steps of:
   constructing a startup assembly template having processor operating commands that cause the processor to set controllable processor operating system parameters from original settings to predetermined settings;
   constructing a unit assembly template containing processor operating commands that define a relationship between data files in a storage medium; and
   constructing a menu assembly template containing processor operating commands to define first multimedia application navigation options.

17. The method of claim 15 wherein the step of displaying the assembly template further comprises the steps of:
   displaying processor operating commands and related data from a startup assembly template on a display in response to a user-entered command;
   displaying processor operating commands and related data from a unit assembly template on a display in response to a user-entered command; and
   displaying processor operating commands and related data from a menu assembly template on a display in response to a user-entered command.

18. The method of claim 15 wherein the step of receiving user commands for selecting the user settings further comprises the steps of:
   displaying the predetermined selectable user settings of the assembly template on a display;
   receiving user-entered additions to and modifications of the predetermined selectable user settings of the assembly template; and
   storing the modified assembly template in a data file.

\* \* \* \* \*